(12) United States Patent
Abiven et al.

(10) Patent No.: US 6,195,720 B1
(45) Date of Patent: Feb. 27, 2001

(54) DEVICE AND METHOD FOR COMMUNICATION BETWEEN ASYNCHRONOUS COMPUTER BUSES USING AN ADAPTER

(75) Inventors: Anne Abiven; Jean-Paul Accarie, both of Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/100,101

(22) Filed: Jun. 19, 1998

(30) Foreign Application Priority Data

Jun. 19, 1997 (FR) .................................................. 97 07647
Jun. 19, 1997 (FR) .................................................. 97 07648
Jun. 19, 1997 (FR) .................................................. 97 07649

(51) Int. Cl.[7] ............................. G06F 13/00; G06F 13/40
(52) U.S. Cl. ........................ 710/128; 710/129; 713/501; 370/402
(58) Field of Search ................................. 710/129, 100, 710/126, 128, 101, 52, 62, 22, 131; 709/200, 250, 253; 370/401, 402, 382; 711/167, 105, 100, 149; 713/501, 600

(56) References Cited

U.S. PATENT DOCUMENTS

| 5,499,344 | * | 3/1996 | Elnashar et al. . | |
|---|---|---|---|---|
| 5,524,270 | * | 6/1996 | Haess et al. . | |
| 5,566,325 | * | 10/1996 | Bruce, II et al. . | |
| 5,632,021 | | 5/1997 | Jennings | 395/309 |
| 5,664,117 | * | 9/1997 | Shah et al. . | |
| 5,761,533 | * | 6/1998 | Aldereguia et al. . | |
| 5,884,027 | * | 3/1999 | Garbus et al. . | |

FOREIGN PATENT DOCUMENTS

| 0710913 | 5/1996 | (EP) . |
|---|---|---|
| 2286910 | 8/1995 | (GB) . |
| WO9700480 | 1/1997 | (WO) . |

\* cited by examiner

Primary Examiner—Gopal C. Ray
(74) Attorney, Agent, or Firm—Fitzpatrick, Cella, Harper & Scinto

(57) ABSTRACT

A device for communication, between at least two asynchronous computer buses, having at least one intermediate storage unit adapted to be accessed in read and/or write mode at least two different frequencies. Each computer bus includes an adapter for interfacing between the computer bus and a memory. Each adapter has an adapter memory and two bidirectional ports, one of the bidirectional ports being connected to the computer bus and the other bidirectional port being connected to the storage unit. Each intermediate storage unit can be accessed in write and/or read mode by each of the computer buses and the interface adapter which is associated with the computer bus.

40 Claims, 9 Drawing Sheets

Figure 1:
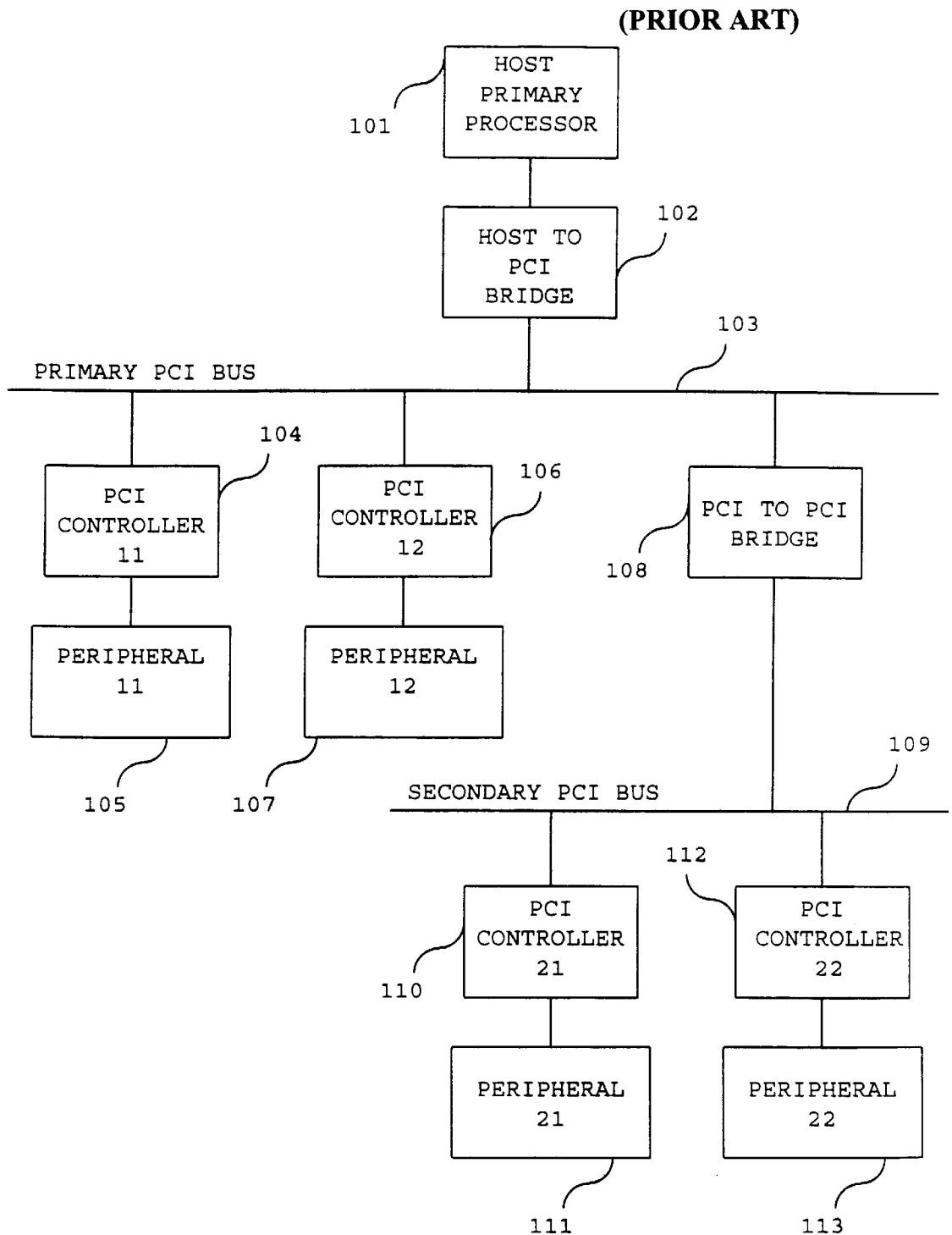

DEVICE AND METHOD FOR COMMUNICATION BETWEEN ASYNCHRONOUS COMPUTER BUSES USING AN ADAPTER

The present invention relates to a device and a method for communication between computer buses.

A computer bus is composed of a set of electrical lines which carry data, addresses, interrupt signals and control signals.

Generally there is a maximum or optimum number of components which can be connected to a given bus. When a computer system is composed of a higher number of components, a supplementary bus may be used to connect some components, this supplementary bus having to be connected to the initial bus by a component called a "bridge". In the field of buses to the so-called "PCI" standard, inter-bus communication or interconnection has a hierarchical nature, that is to say one of the buses is referred to as primary and the other is referred to as secondary. By using, between these buses, a so-called "bridge" component, defined by the standard of the bus, the configuration of the components connected to the secondary bus and their access to the primary bus are controlled by the primary bus.

The bus known to persons skilled in the art by the name PCI ("Peripheral Component Interconnect") is a bus for the interconnection of processors, peripheral controller components or memories.

A PCI to PCI bridge, as defined by the standard *"PCI to PCI Bridge Architecture Specification, Revision 1.0"*, allows a connection between two PCI buses in order to perform transactions between a "master" on one PCI bus and a "slave" on the other PCI bus. A bridge therefore has two interfaces, each of them capable of being master or slave on the bus to which it is connected.

An inter-bus interconnection made with such a bridge has the following drawbacks, when there is a processor on each bus:

each component which has a direct interface with a PCI bus has configuration registers, the addresses of which are defined by the PCI standard. These configuration registers are read and then initialised by the processor present on the primary bus, called the "host" processor. On power-up, the processor present on the PCI bus starts a program for configuring the various peripherals present on the bus. This program may be the program called, by persons skilled in the art, BIOS ("Basic Input Output System"). This program is executed by means of an interface component placed between the processor and the PCI bus, a component which carries the configuration commands to the various components it recognises on the bus and on the buses present behind any "bridges". These configuration commands are reads from and writes to various configuration registers and make it possible to allocate memory space or input/output space as well as interrupts according to requests from the various configurable components.

If a PCI to PCI bridge is present on the bus, it carries the data intended for the components present behind it, that is to say on the secondary PCI bus. When at least two buses are connected by a PCI to PCI bridge component and each bus is connected to a processor, each processor, through its bus interface component, attempts to initialise all the components present on its bus and on the bus present behind the PCI to PCI bridge. This therefore creates an initialisation conflict since each component undergoes two initialisations. in order to communicate, the two processors must be able to access the memory present on the bus to which they are not directly connected. As a result of the bridge, the same addresses may be used for different memory registers on either side of the bridge. Consequently, the transactions can be performed between the two buses only when two different address registers are used on either side of the bridge.

the clocks of the two processors are asynchronous and it is often impossible to generate a processor clock with a bus clock. Furthermore, certain PCI to PCI bridges (for example, the component referenced 1960RP from the company formed under American law INTEL) have significant synchronisation constraints, which necessitates that all the clocks originate from the same source on each of the two buses.

The invention intends to remedy these drawbacks.

To this end, the present invention relates, according to a first aspect, to a device for communication between at least two asynchronous computer buses, characterised in that it has:

at least one intermediate storage means adapted to be accessed in read and/or write mode at at least two different frequencies, for each computer bus, an adapter for interfacing between the said computer bus and a storage means, having an adapter memory and two bidirectional ports, one of the said bidirectional ports being connected to the said computer bus and the other bidirectional port being connected to the said storage means, each intermediate storage means thus being capable of being accessed in write and/or read mode by means of each of the said computer buses and the interface adapter which is associated with the said computer bus.

Thus each storage means can be accessed in write mode and read mode by each computer bus, without it being necessary for these computer buses to operate synchronously or even at the same frequency, without it being necessary for the addresses used to access the storage means to be necessarily identical, and without a joint initialisation of the components on the different computer buses being necessary.

The architectures of the electronic or computer systems connected to the different computer buses can therefore be designed independently and operate in an independent manner, apart from the phases of communication between these buses.

According to particular characteristics, one of the storage means comprises a dual port random access memory, each port of the said random access memory being connected to one of the interface adapters.

By virtue of these provisions, two computer buses can have access to one of the ports of each dual port memory.

According to particular characteristics, one, at least, of the storage means comprises a random access memory in which the access to the data is made in the same order in read mode as in write mode, the input of the said random access memory being connected to one of the local ports and the output of the said memory being connected to another local port.

Preferentially, one, at least, of the storage means comprises two random access memories in which the access to the data is made in the same order in read mode as in write mode, the input of a first one of the said random access memories and the output of a second one of the said random access memories being connected to one of the local ports, on the one hand, and the output of the first one of the said random access memories and the input of the second one of the said random access memories being connected to another local port, on the other hand.

By virtue of each of these provisions, the writing and reading of data can be performed at high speed, the reading and writing in FIFO type memories, which correspond to the random access memories mentioned above, being particularly faster than in addressable memories.

According to particular characteristics, one, at least, of the adapter memories has an interrupt and/or address register which are assigned to it for operation of the adapter having the said memory, in relation with the computer bus to which it is connected.

By virtue of these provisions, the communication means according to the invention is considered, for its operation in relation with the computer bus connected to the said adapter, as a peripheral.

According to particular characteristics, two, at least, of the adapters are adapted to operate in direct memory access mode.

By virtue of these provisions, high-speed transfers can be performed using the said adapters in direct memory access mode.

According to a second aspect, the invention relates to a method of communication between at least two asynchronous computer buses, characterised in that it includes:

a step of storing in an intermediate storage means adapted to be accessed in write mode, by means of a first computer bus associated with a first interface adapter having an adapter memory and two bidirectional ports, one of the said bidirectional ports being connected to the first computer bus and the other bidirectional port being connected to the said storage means, a step of reading from the said intermediate storage means adapted to be accessed in read mode, by means of a second computer bus associated with a second interface adapter having an adapter memory and two bidirectional ports, one of the said bidirectional ports being connected to the second computer bus and the other bidirectional port being connected to the said storage means.

The present invention relates, according to a third aspect, to a data communication device characterised in that it has at least two storage means:

a first intermediate storage means, a second intermediate storage means, at least one of whose operating characteristics is different from that of the first intermediate storage means in at least one of the write or read modes, a switching means adapted to allow writing and/or reading in one of the first or second intermediate storage means, and a means of selecting a storage means adapted to take into account a criterion related to a set of information in order to control the operation of the said switching means and the transmission of the said set of information.

By virtue of these provisions, according to the criterion taken into account by the selection means, the switching means is switched and the information is transmitted by means of the storage means in which the switching means allows access in write or read mode.

According to particular characteristics, the communication device which is the object of the present invention also has a means of determining the value of a performance criterion necessary for the transmission of a set of information by means of one of the first or second storage means, the said performance criterion being the criterion taken into account by the storage means selection means.

By virtue of these provisions, according to the performances necessary for effecting a transmission of information, a performance criterion is determined and taken into account by the selection means for determining which of the storage means is used for the transmission of the said information.

According to particular characteristics, a different operating characteristic for the two storage means being an access speed, the means of determining the value of a performance criterion is adapted to determine, as a performance criterion, the transfer speed.

By virtue of these provisions, the information transmissions which require a high transfer speed are effected using the first storage means, whilst the information transmissions which do not require such a transfer speed are effected using the second storage means.

According to particular characteristics, the means of determining the value of a performance criterion is adapted to determine, as a performance criterion, the dimension of the information blocks to be transmitted.

By virtue of these provisions, the transmissions of large quantities of information are effected using the first storage means, whilst the transmissions of small quantities of information are effected using the second storage means.

According to particular characteristics:

the means of determining the value of a performance criterion is adapted to determine, as a performance criterion, the urgency in effecting the transfer of information, the selection means is adapted to send, when the said transfer is urgent, a signal representing the presence of urgent information, intended for a recipient of the said information to be transferred.

By virtue of these provisions, the transmissions of information of an urgent nature are effected using the first storage means, whilst the transmissions of non-urgent information are effected using the second storage means.

According to particular characteristics:

one of the storage means has a dual-port memory, at least one of the storage means has a memory in which access to the data is gained in the same order in read mode as in write mode, the input of the said memory being connected to one of the local ports and the output of the said memory being connected to another local port, and/or the device as briefly disclosed above has at least two intermediate storage means, one of the intermediate storage means being adapted to the transmission of parameters relating to a future transmission using another intermediate storage means.

By virtue of these provisions, the first storage means can include a FIFO-type memory, whilst the second storage means can include a dual-port memory, this dual-port memory being able to be used for transmitting parameters with a view to a transmission in direct-access mode to the memory using the FIFO-type memory.

According to particular characteristics, the switching means is adapted to keep the storage means switched until the selection means has effected a new selection.

By virtue of these provisions, the selection effected by the selection means may give rise only to the sending of a single switching signal, a signal serving to determine the position of the switching means until the next switching signal.

According to particular characteristics, the device as briefly disclosed above has:

for each of at least two computer buses, an interface adapter between the said computer bus and a storage means, having an adapter memory and two bidirectional ports, one of the said bidirectional ports being connected to the said computer bus and the other bidirectional port being connected to the said storage means, each intermediate storage means thus being able to be accessed in write and/or read mode by means of each of the said computer buses and the interface adapter which is associated with the said computer bus.

Thus each of the storage means can be accessed in write and read mode for each of the computer buses, without it being necessary for these computer buses to operate synchronously or even at the same frequency, without it being necessary for the addresses used for accessing the storage means necessarily being identical, and without a conjoint initialisation of the components on the different computer buses being necessary.

The architectures of the electronic or computer systems connected to the different computer buses can therefore be designed independently and function independently, beyond the phases of communication between these buses.

According to particular characteristics, the communication device as briefly disclosed above has, for at least one of the said storage means:

a working area adapted to receive, in write mode, blocks of information intended to be read, an empty packet management area including at least one position data item for obtaining at least one address of part of the working area with which no information to be read is associated, and for each of at least two reading/writing means an available packet management area including, when at least one information packet is intended for the said reading/writing means, at least one position data item for obtaining at least one address of part of the working area at which information intended for the said reading/writing means has been written, and it that it has, for each reading/writing means, an organisation means adapted so that:

each time information must be written in the said storage means, intended for a reading/writing means:

an address is extracted from the addresses which the position data of the empty packet management area makes it possible to obtain, the said information is written in part of the working area which corresponds to the said address, and the said address is added to the addresses which the position data item of the available packet management area associated with the said reading/writing means makes it possible to obtain; and each time information has to be read in the said storage means, by a reading/writing means:

an address is extracted from the addresses which the position data item of the available packet management area associated with the said reading/writing means makes it possible to obtain, the said information is read in the part of the working area which corresponds to the said address, and the said address is added to the addresses which the position data item of the empty packet management area makes it possible to obtain.

By virtue of these provisions, it is not necessary to reserve part of the working area for each of the reading/writing means and the allocation of the memory space of this working area is dynamic and flexible. The different parts of the working area can thus be used successfully for the transfer of information between any two of the reading/writing means. In addition, each of the reading/writing means can use the entire memory space of the working area when necessary.

The invention relates, according to a fourth aspect, to an information communication method characterised in that it includes:

a storage means selection step, during which account is taken of a criterion related to a set of information for choosing between a first intermediate storage means, and a second intermediate storage means at least one of whose operating characteristics is different from that of the first intermediate storage means in at least one of the write or read modes, a switching step during which access is gained, in write and/or read mode, to the intermediate storage means chosen, and an information transmission step, during which the said information is transmitted using the storage means chosen.

The present invention relates, according to a fifth aspect, to a device for communication between at least two memory read/write means, a device including a storage means, characterised in that the said storage means has:

a working area adapted to receive, in write mode, blocks of information intended to be read, an empty packet management area including at least one position data item for obtaining at least one address of part of the working area with which no information to be read is associated, and for each read/write means, an available packet management area including, when at least one information packet is intended for the said read/write means, at least one position data item for obtaining at least one address of part of the working area at which information intended for the said read/write means has been written, and it that it has, for each read/write means, an organisation means adapted so that:

each time information must be written in the said storage means, intended for a read/write means:

an address is extracted from the addresses which makes it possible to obtain the position data item of the empty packet management area, the said information is written in part of the working area which corresponds to the said address, and the said address is added to the addresses which the position data item of the available packet management area associated with the said read/write means makes it possible to obtain; and each time information has to be read in the said storage means, by a read/write means:

an address is extracted from the addresses which the position data item of the available packet management area associated with the said read/write means makes it possible to obtain, the said information is read in the part of the working area which corresponds to the said address, and the said address is added to the addresses which the position data item of the empty packet management area makes it possible to obtain.

By virtue of these provisions, it is not necessary to reserve part of the working area for each of the read/write means, and the allocation of the memory space of this working area is dynamic and flexible. The different parts of the working area can thus be used successively for the transfer of information between any two of the write/read means. In addition, each of the read/write means can use any memory space in the working area when necessary.

According to particular characteristics, each position data item consists of a pointer in a list of addresses of the working area.

By virtue of these provisions, chained address lists can be used, which allows an adaptation of the memory space to the quantity of information corresponding to each transfer.

According to particular characteristics, the device as briefly disclosed above also has an interrupt means adapted to transmit, to the read/write means for which information is intended, a signal representing the presence of information in the area for the management of packets available for the said read/write means.

By virtue of these provisions, the read/write means for which the information is intended is informed of the availability of this information, without having to monitor the available packet area which concerns it.

According to particular characteristics, the device as briefly disclosed above has a means of protecting accesses to the said management areas of the storage means, adapted to inhibit, at one and the same time, access in read or write mode to the same part of the working area by two read/write means.

By virtue of these provisions, the integrity of the data stored in the working area is ensured.

According to particular characteristics, the device as briefly disclosed above has:

for each read/write means, an interface adapter having an adapter memory and two bidirectional ports, one of the said bidirectional ports being connected to the said read/write means and the other bidirectional port being connected to the said storage means, each storage means being thus able to be accessed in write and/or read mode for each of the read/write means by means of the interface adapter which is associated with the said read/write means.

Thus each of the storage means can be accessed in write and read mode by means of each of the computer buses, without it being necessary for these computer buses to operate synchronously or even at the same frequency, without it being necessary for the addresses used for accessing the storage means necessarily to be identical, and without conjoint initialisation of the components on the different computer buses being necessary.

The architectures of the electronic or computer systems connected to the different computer buses can therefore be designed independently and function independently, outside the phases of communication between these buses.

The invention also relates to a computer system including a processor, characterised in that it includes a communication device as briefly disclosed above and a computer system including a processor, a display screen and a keyboard, characterised in that it includes a communication device as briefly disclosed above.

The invention relates, according to a sixth aspect, to a method of communication between at least two memory read/write means, characterised in that it uses a storage means having:

a working area adapted to receive, in write mode, blocks of information intended to be read, an empty packet management area including at least one position data item for obtaining at least one address or part of the working area with which no information to be read is associated, and for each read/write means, an available packet management area including, when at least one information packet is intended for the said read/write means, at least one position data item for obtaining at least one address of part of the working area at which information intended for the said read/write means has been written, and in that it includes, each time information must be written in the said storage means, intended for a read/write means:

an extraction operation during which an address is extracted from the addresses which the position data item of the empty packet management means makes it possible to obtain, a writing operation, during which the said information is written in part of the working area which corresponds to the said address, and a release operation during which the said address is added to the addresses which the position data item of the available packet management area associated with the said read/write means makes it possible to obtain; and each time information must be read in the said storage means, intended for a read/write means:

an extraction operation during which an address is extracted from the addresses which the position data item of the available packet management area associated with the said read/write means makes it possible to obtain, a reading operation, during which the said information is read in the part of the working area which corresponds to the said address, and a release operation, during which the said address is added to the addresses which the position data item of the empty packet management area makes it possible to obtain.

The invention also relates to a computer system including a processor, characterised in that it has a communication device as briefly disclosed above and a computer system including a processor, a display screen and a keyboard, characterised in that it includes a communication device as briefly disclosed above.

Since these computer systems and method have the same advantages as the devices briefly disclosed above, these advantages are not repeated here.

Figure 2:
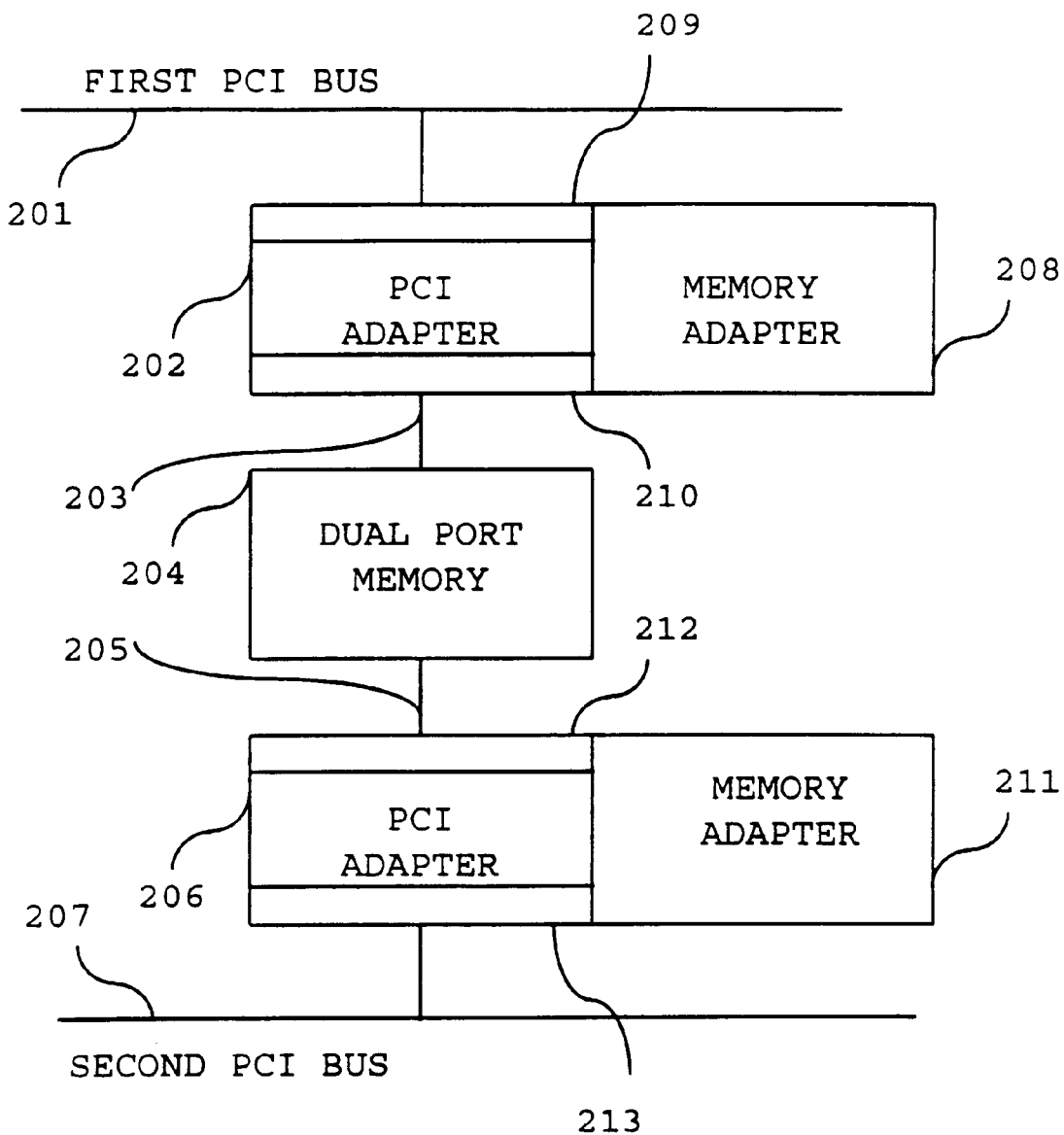
Figure 3:
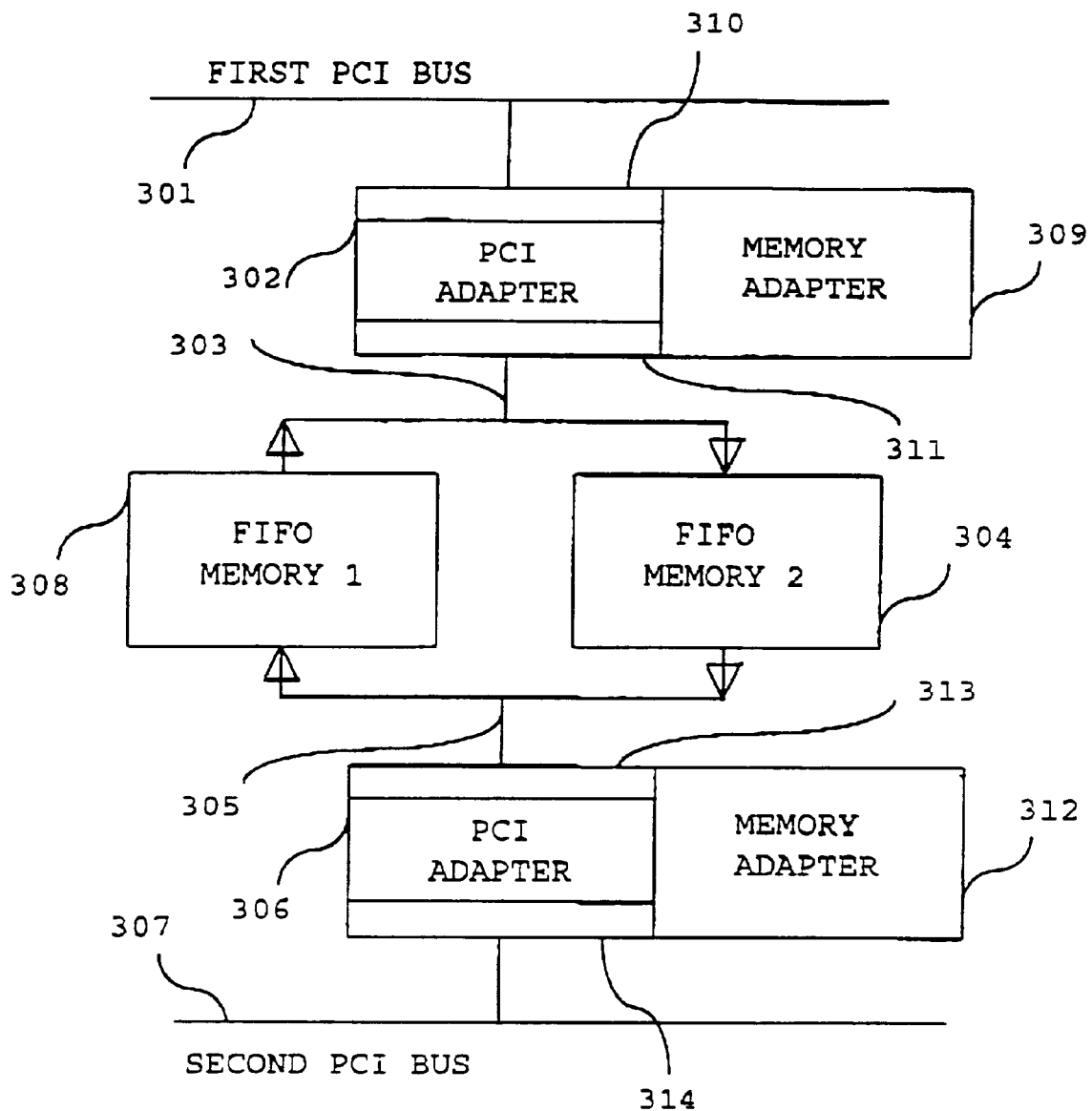
Figure 4:
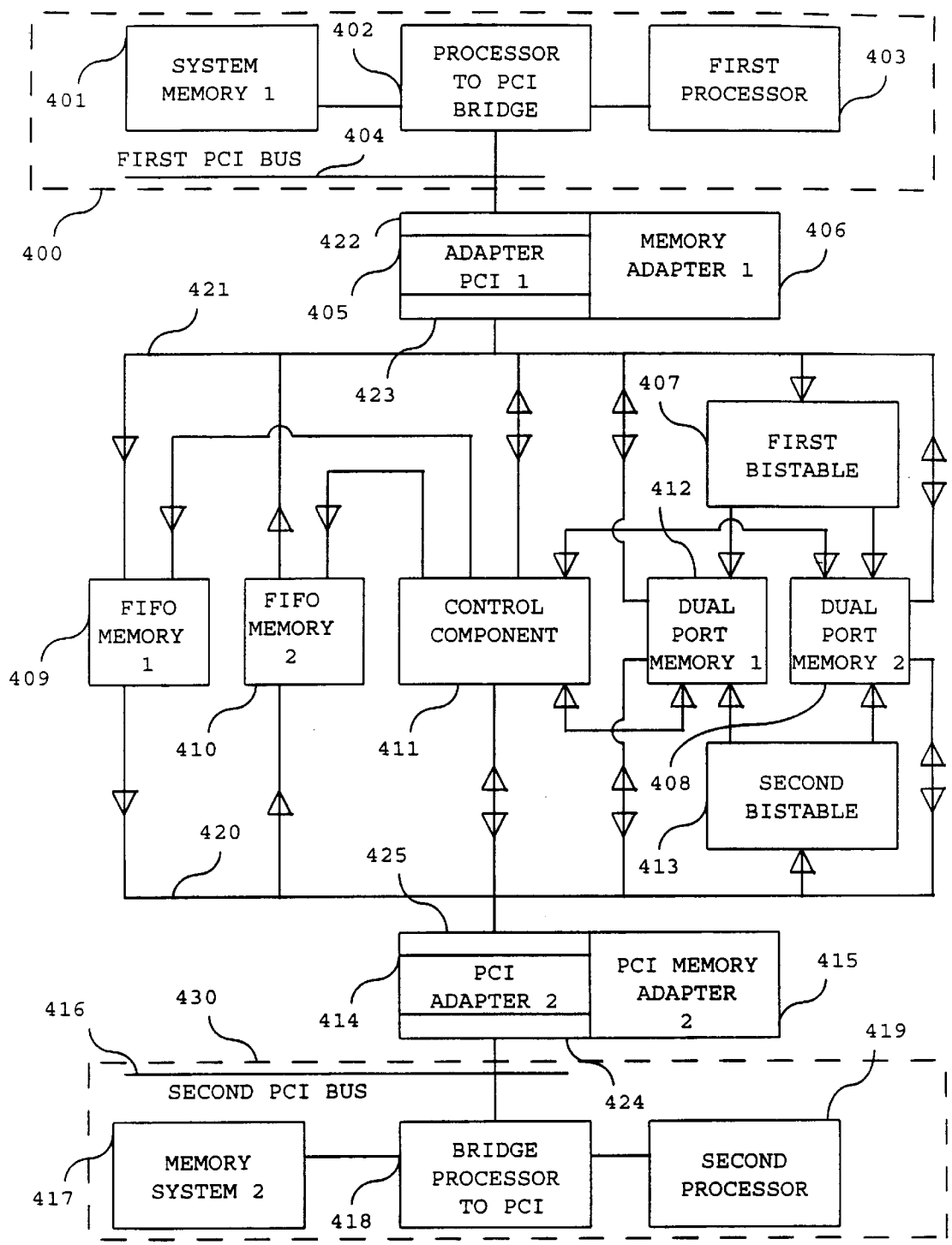
Figure 5:
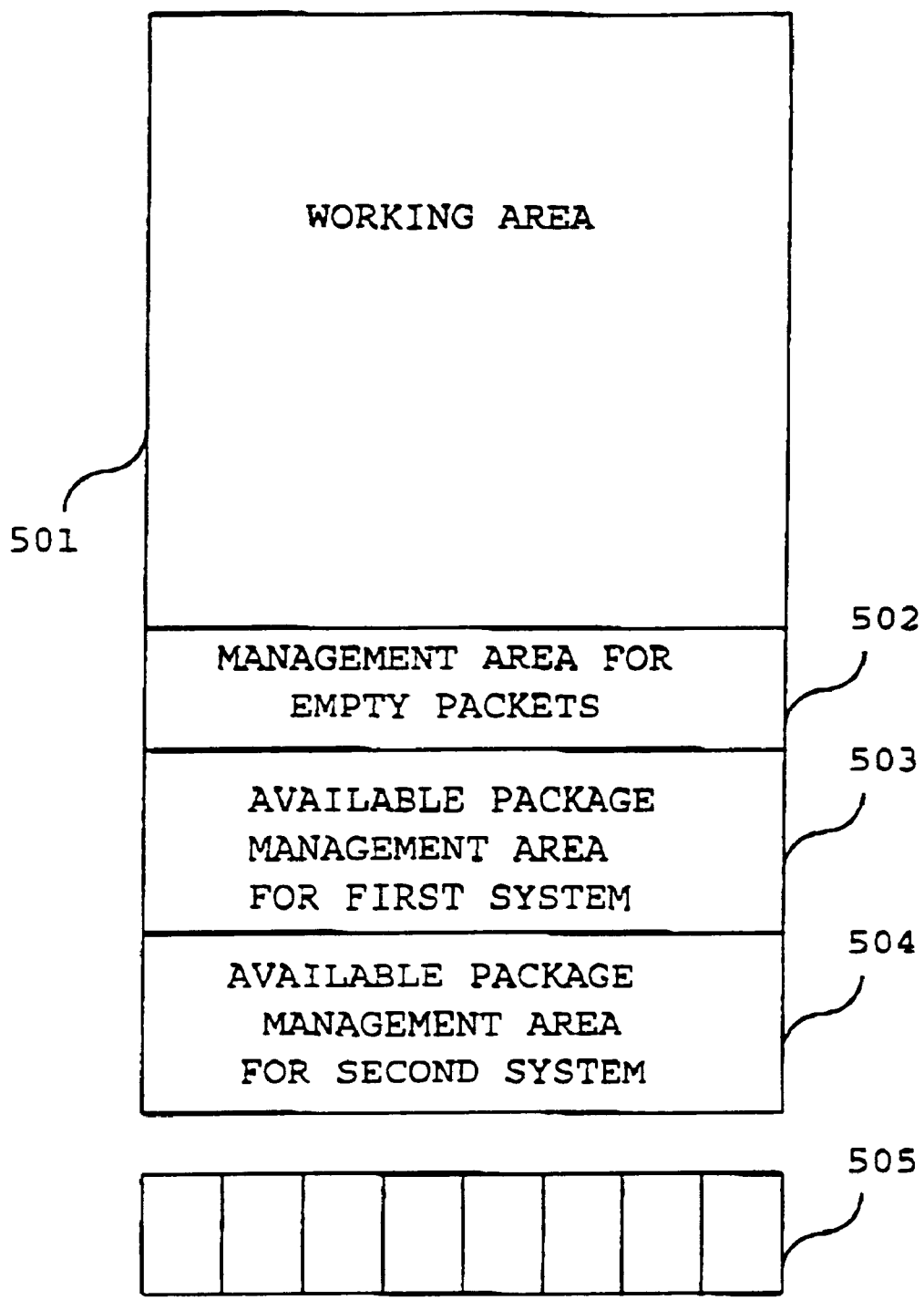
Figure 6:
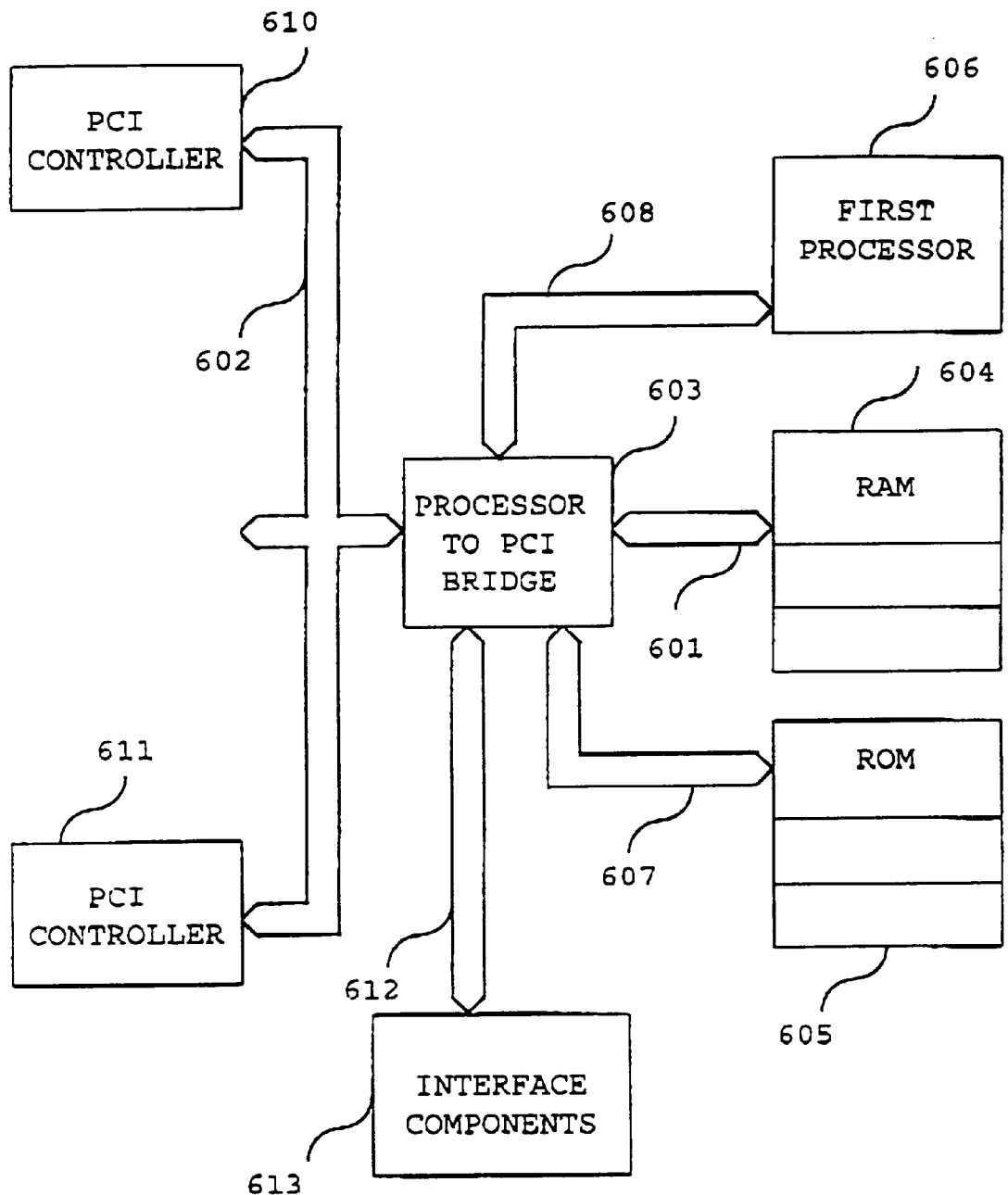
Figure 7A:
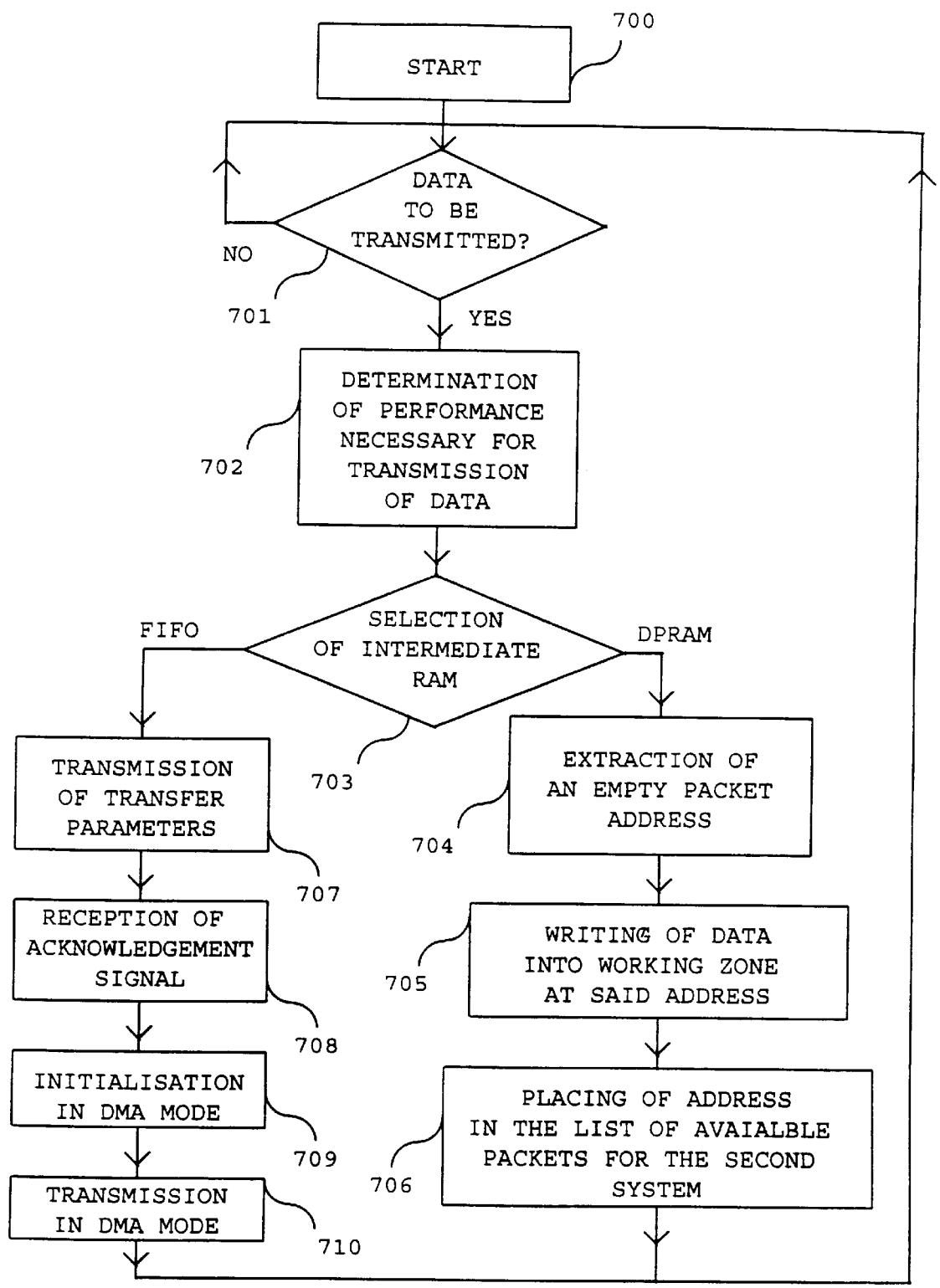
Figure 7B:
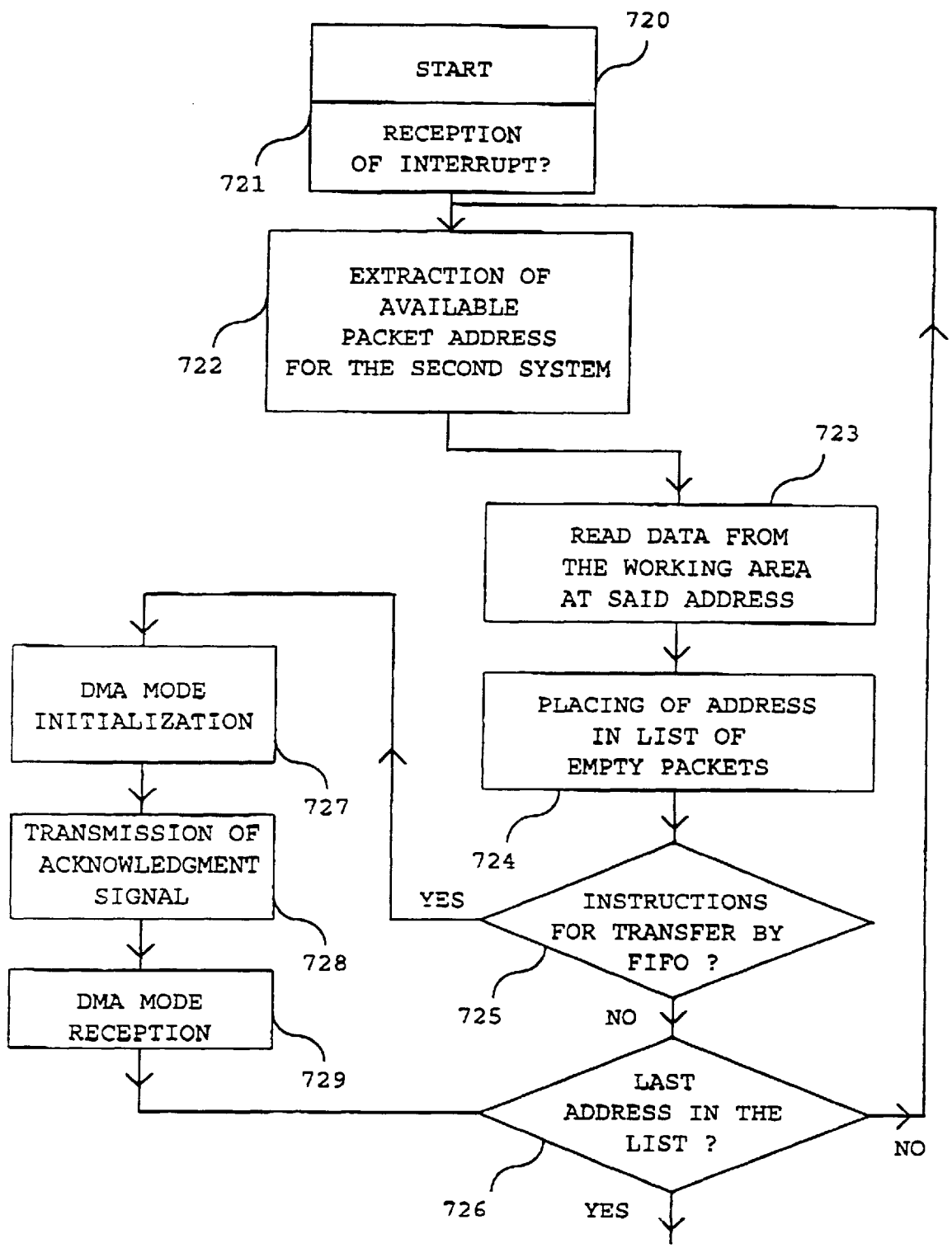
Figure 8:
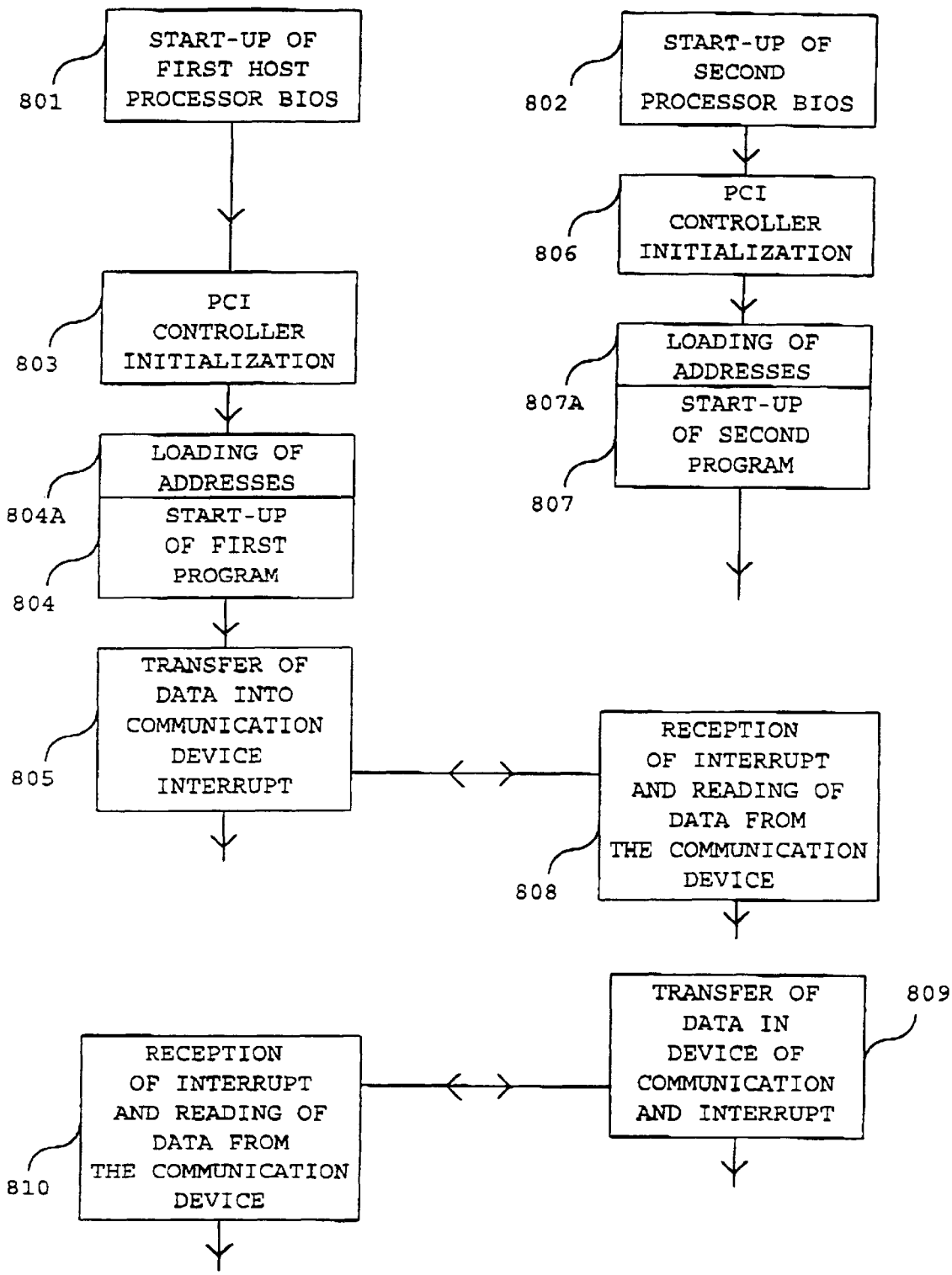

The invention will emerge more clearly in the light of the description which follows, given with reference to the accompanying drawings in which:

FIG. 1 depicts a simplified electronic diagram of a computer system with two PCI buses, according to the prior art, FIG. 2 depicts a functional diagram of a first embodiment of an inter-bus communication device, FIG. 3 depicts a functional diagram of a second embodiment of an inter-bus communication device, FIG. 4 depicts a third embodiment of an inter-bus communication device, FIG. 5 depicts a memory organisation used in the first and third embodiments illustrated in FIGS. 2 and 4, FIG. 6 depicts a computer system which is adapted to use each embodiment, FIG. 7A depicts a flow diagram of operation in write mode of the system illustrated in FIGS. 4 and 6, FIG. 7B depicts a flow diagram of operation in read mode of a system illustrated in FIG. 4, and FIG. 8 depicts a timing diagram of operation of two computer systems connected by an inter-bus communication device.

In the description which follows, except with reference to FIG. 1, one of the systems and certain of the components connected to it are called first and the other system and certain of the components connected to it are called second, without any hierarchy existing between these systems.

For reasons of clarity, the following are below called random access memory or storage means: any component, system or means capable of being accessed in write mode in order to receive information, of storing the said information and of being accessed in read mode in order to transmit the said information. In particular these are storage means or memories, the components of memories known to persons skilled in the art of electronics under the names RAM, FIFO, DPRAM, EPROM, EEPROM, diskette, hard disk, rewritable CD-ROM, magnetic tapes, etc.

It may be noted that persons skilled in the art call a FIFO ("First In First Out") type memory, a memory in which the data are read in the same order as they were previously written.

In FIG. 1, a primary or host processor 101, of known type, for example of INTEL PENTIUM make, is connected by means of a host to PCI bridge 102 to a primary PCI bus 103 of a primary computer system having two PCI controllers 104 and 106 respectively connected to two so-called, here, "primary" computer peripherals 105 and 107.

The primary PCI bus is connected, by means of a PCI to PCI bridge 108, to a secondary PCI bus 109, itself connected to two PCI controllers 110 and 112, respectively connected to two so-called, here, "secondary" computer peripherals 111 and 113.

Each computer bus is composed of a set of electrical lines which carry data, addresses, interrupt signals and control signals. The PCI bus is a bus for the interconnection of processors, peripheral controller components or memories.

Above a maximum or optimum number of peripherals connected to the PCI primary bus 103, it is necessary to use a second bus, here composed of the secondary bus 109, connected to the initial bus by means of a "PCI to PCI bridge" component, in compliance with the standard known by persons skilled in the art under the name "PCI: PCI local bus specification revision 2.1".

In the prior art illustrated in FIG. 1, the inter-bus communication or interconnection has a hierarchical nature, that is to say only one bus is referred to as "primary" and therefore responsible for carrying the PCI configuration commands to the various subjacent buses.

The component called "PCI to PCI bridge" 108 allows a connection between the two PCI buses 103 and 109 in order to perform transactions between the so-called "master" computer system and the so-called "slave" computer system. A bridge therefore has two interfaces, each of them being capable of being master or slave on the bus to which it is connected.

As explained above, the PCI to PCI bridge does not allow an efficient and flexible operation of two computer systems based, on the one hand, on the primary bus 103 connected to the primary processor 101 and, on the other hand, on the secondary 109 connected to a secondary processor (illustrated in FIG. 4).

In FIG. 2, a first embodiment of a communication device is positioned between a first bus 201 connected to a PCI adapter 202, itself connected to a local bus 203, and a second bus 207 connected to a PCI adapter 206, itself connected to a local bus 205. An input port and an output port of a dual port memory 204 are connected to each of the local buses 203 and 205.

Each PCI adapter thus constitutes an adapter for interfacing between one of the PCI computer buses and a local bus. The PCI adapter 202 has a so-called "adapter" memory 208 which may be composed of one or more registers, as mentioned in the above-mentioned standard "PCI: PCI local bus specification revision 2.1, and two bidirectional ports 209 and 210, the bidirectional port 209 being connected to the first computer bus 201 and the bidirectional port 210 being connected to a said local bus 203. In an identical manner, the PCI adapter 206 has a so-called "adapter" memory 211 and two bidirectional ports 212 and 213, the bidirectional port 213 being connected to the second computer bus 207 and the bidirectional port 212 being connected to a said local bus 205.

Each of the computer buses 201 and 207 can thus access the intermediate memory 204 in write or read mode, by means of an interface adapter.

The structure of the dual port memory 204 is explained with reference to FIG. 5.

In FIG. 3, a second embodiment of an inter-bus communication device is positioned between a first bus 301 connected to a PCI adapter 302, itself connected to a local bus 303, and a second bus 307 connected to a PCI adapter 306, itself connected to a local bus 305. An input port of a FIFO type intermediate memory 304 and an output port of a FIFO type intermediate memory 308 are connected to the local bus 303. An input port of the FIFO type intermediate memory 308 and an output port of the FIFO type intermediate memory 304 are connected to the local bus 305.

Each PCI adapter thus constitutes an adapter for interfacing between one of the PCI computer buses and a local bus. The PCI adapter 302 has a so-called "adapter" memory 309 and two bidirectional ports 310 and 311, the bidirectional port 310 being connected to the first computer bus 301 and the bidirectional port 311 being connected to a said local bus 303. In an identical manner, the PCI adapter 306 has a so-called "adapter" memory 312 and two bidirectional ports 313 and 314, the bidirectional port 314 being connected to the second computer bus 307 and the bidirectional port 313 being connected to a said local bus 305.

Each of the intermediate memories 304 or 308 can thus be accessed in read mode through one of the computer buses by means of an interface adapter and in write mode through the other computer bus and by means of the other interface adapter.

As illustrated in FIG. 4, the third embodiment of the communication device puts into communication:

on the one hand, a first computer system 400 having a first PCI bus 404, connected to a first processor to PCI bridge 402, itself connected to a system memory 401 and to a first processor 403 and, on the other hand, a second computer system 430 having a second PCI bus 416, connected to a second processor to PCI bridge 418, itself connected to a memory 417 of the second computer system and to a second processor 419.

The inter-bus communication device can just as easily be independent, being, for example, integrated into a specific circuit, be permanently associated with one of the computer systems, for example within a card or a computer, or even be permanently associated with a number of computer systems, for example in a computer having a number of processors working in parallel.

According to the third embodiment, the communication device has, connected to the first PCI bus 404, a PCI adapter 405 itself having a computer bus port 422 and a local bus port 423. An adapter memory 406 contains registers, certain of which are used for the assignment of memory and interrupts, by the first computer system, to which the PCI adapter 405 is directly connected.

The local bus port 423 is connected to the write terminals of a FIFO type intermediate memory 409, to the read terminals of a FIFO type intermediate memory 410, to a bistable circuit 407, to a port of each of the two dual port intermediate memories 408 and 412 and to a control component 411.

In the embodiment described and depicted, since the PCI buses are 32-bit buses and the dual port intermediate memories 408 and 412 each have only 16-bit ports, two dual port intermediate memories are used in parallel.

In each of the dual port intermediate memories 408 and 412, when writing of data coming from one of the computer buses 404 or 416 is performed, this computer bus can perform a write to a predetermined particular address of this memory in order to thus cause the generation of an interrupt intended for the other computer bus. This interrupt signal allows the processor which is connected to that other computer bus to know that data are intended for it in the dual port intermediate memory.

In each of the dual port intermediate memories 408 and 412, eight semaphores are available for, notably, allowing management of the memory space of each dual port memory (FIG. 5). Before writing into or reading from the said memory, one of the computer buses 404 or 416 must acquire a semaphore. This semaphore relates to a management area of the dual port intermediate memory. When this computer bus 404 or 416 has acquired this semaphore, the latter is allocated to it, and the other port cannot acquire this semaphore until it has been deallocated. The bus which has not obtained the semaphore must not access, either in read or write mode, the area relating to this semaphore, for reasons of ensuring the integrity of the data for the moment stored by the dual port memory.

It may be noted that the FIFO intermediate memories 409 and 410 contain less information but are faster than the dual port intermediate memories 408 and 412. Furthermore, these FIFO intermediate memories are not associated with interrupt signals.

The output port of the bistable circuit 407 is connected to the address port of each of the dual port intermediate memories 408 and 412.

The control component 411 is a programmable component of the type known under the name FPGA ("Field Programmable Gate Array"), and manages the different control signals necessary for accessing the various components used.

This control component 411 receives, from the PCI adapter 405, signals which it matches with signals for selecting the memories in write or read mode or for enabling memory functions. It also receives signals, notably interrupt, from the dual port intermediate memories, signals which it matches with signals for the interface adapter concerned with its signals.

The bistable circuit 407 makes it possible to use, on the local bus 421, multiplexing of the addresses of the memories 408 and 412 and the data intended to be stored therein.

In a symmetrical fashion, the second PCI computer bus 416 is connected, by means of a PCI adapter 414 having a computer bus port 424 and a local bus port 425 and connected to an adapter memory 415, to the local bus 420. The local bus 420 is also connected to the terminals for reading from the FIFO type intermediate memory 409, to the terminals for writing into the FIFO type intermediate memory 410, to the control component 411, to a bistable circuit 413 and to a port of each of the two dual port intermediate memories 408 and 412. The output port of the bistable circuit 413 is connected to an address port of each of the intermediate memories 408 and 412.

In the embodiment described here, the two computer buses 404 and 416 are asynchronous, they use different operating frequencies but implement the same communication protocols.

The PCI adapters 405 and 414 are referenced AMCC s5933 (manufactured by the Applied Micro Circuits Corporation), and each have a PCI interface, on the one hand and a local bus interface, on the other hand. These adapters have address registers which are each configured by the PCI bus to which the said PCI adapter is connected.

The two intermediate memories of FIFO type, that is to say ones of which the stored data are read in the same order as they were written into memory, each have a single input, or write, port, connected to the local bus interface of one of the PCI adapters, and an output, or read, port, connected to the local bus interface of the other PCI adapter.

It may be noted here that certain electronic components have two FIFO type memories, each input port of one of these memories being connected to the output port of the other memory. Such components are preferentially used in the embodiment given here.

The first processor 403 thus considers the communication device as an interface component connected to an electronic system not having a processor. It therefore configures the PCI adapter to which the first bus is connected as a conventional PCI component connected to this bus, by loading into the registers of the adapter memory 406 an interrupt number and base register addresses in order to be able to access the intermediate memories.

In an identical manner, the second processor 419 considers the communication device as an interface component connected to an electronic system not having a processor. It therefore configures the PCI adapter to which the second bus is connected as a conventional PCI component connected to this bus.

Initially, in the embodiment described and depicted in FIG. 4, in which the adapters are referenced AMCC s5933, these PCI adapters may be operated according to one of two modes, one being known under the name "pass through", and the other under the name "DMA".

The direct memory access, DMA, mode of the first interface adapter 405 is a transfer mode allowing a high-speed data transfer between the first PCI bus 404 and the first local bus 421 (referred to as "add-on") without requiring any complex logic implementation. In order to perform a write into an intermediate memory, this transfer mode uses one of the FIFO memories internal to each interface adapter and the FIFO intermediate memory 409, connected in cascade, downstream of the FIFO internal memory of the first interface adapter 405 and upstream of the FIFO internal memory of the second interface adapter 414, which then also operates in DMA mode.

When the first processor 403 wishes to write into the FIFO intermediate memory 409, it generates the signals necessary for writing into the FIFO internal memory of the interface adapter 405 to which it is directly connected and the data are transferred, under the control of this adapter 405, into the FIFO intermediate memory 409.

The logic implemented in the control component 411 generates the signals necessary for the FIFO intermediate memory 409. In parallel, the second processor 419 generates the necessary signals so that the second interface adapter 414 also uses the direct memory access mode.

The direct memory access mode can, in the same way, be used for transmissions performed from the second computer system to the first computer system, using, however, the FIFO intermediate memory 410.

In order to perform a read in direct memory access mode, the interface adapter uses the same functions as those described above, but using the FIFO intermediate memory 410.

The operating mode known to persons skilled in the art under the name "pass-through" allows a data transfer between the first PCI bus 404 and peripherals situated on the first local bus 421, in the present case the dual port memories 408 and 412.

To this end, the first processor 403 transmits to the interface adapter 405 a base register address for that adapter.

The control component 411 then generates the appropriate signals in order to select the dual port intermediate memories 408 and 412 and apply to them the control signals necessary to perform a read or a write. The address is then presented on the local bus 421 and stored by the bistable circuit 407. Next, in write mode, the data are transferred from the first PCI bus 404 to the first local bus 421 and stored in the dual port memories 408 and 412, or, in read mode, the data are read from the dual port memories 408 and 412 onto the first local bus 421 and then transferred to the first PCI bus 404.

The second interface adapter 414 allows, in an identical manner, the transfer of data in "pass-through" mode.

When the first computer system has to transfer data, in direct memory access mode, to the second computer system, it transfers, by means of the dual port memories 408 and 412, information representing the size of the data block to be transferred and the protocol to be established.

The dual port memories 408 and 412 then generate, jointly with the control component 411, an interrupt on the second PCI bus 416, by means of the PCI adapter 414 which is directly connected to it. To this end, the first processor 403 performs a write into the memories 408 and 412 at a predetermined particular address.

According to variants, the generation of interrupts intended to inform the destination computer system that data are intended for it in the dual port memories may be output according to different rules:

an interrupt is generated each time a number N of writes into these memories has been performed, when at least one write into these memories has been performed, an interrupt is generated at the end of a predetermined duration, an interrupt is generated each time a writing of data of a high-priority nature into these memories has been performed, the high-priority nature of each transmission being defined by the source system according to known techniques which are not repeated here.

The interrupt under consideration is transmitted to the second processor 419 which initialises the second computer system in direct memory access mode, known under the name "DMA", for the transfer of the data block, and sends an acknowledgement signal by means of the PCI adapter 414 to which the second bus 416 is connected, and the dual port memories 408 and 412, to the first processor 403. The generation of a new interrupt by the second processor 419 allows the first processor 403 to know that the acknowledgement data are intended for it in the dual port intermediate memories.

The first processor 403 then initialises the first computer system in direct memory access, DMA, and the data to be transmitted are transferred from the memory 401 of the first computer system to the memory 417 of the second computer system, by means of the PCI adapters 405 and 414, which then operate in DMA mode and the FIFO intermediate memory whose input and output buses are oriented in the direction of the transfer under consideration, that is to say here the FIFO memory 409.

It may be noted that the operation of each dual port memory is organised by the use of semaphores, allowing dynamic sharing of the memory.

Thus, no addressing, clock or initialisation problem arises, with regard to each bus, the communication device and the computer system connected to the other bus behaving jointly as a peripheral of known type: it uses nothing more than what is required by a PCI adapter of a peripheral not having a processor.

It may be noted, in fact, that the two buses can be asynchronous, that the addresses can be identical for different registers on either side of the communication device, without causing any interference, and that the initialisations of the two buses are totally independent and without conflict.

FIG. 5 depicts a particularly advantageous organisation of the dual port intermediate memories 204, 408 and 412 used in the first and third embodiments, illustrated in FIGS. 2 and 4.

Each of these memories has:

a so-called "working" area 501 adapted to receive, in write mode, blocks of information intended to be read, a so-called "empty packet management" area 502 containing so-called "position" data making it possible to find the positions of memory blocks in the working area, positions not associated with any information to be read and available for future writes. Among these data are notably the position of the first element in the list describing the empty packets according to two chainings, the first chaining of the list makes it possible to scan the elements according to increasing addresses of the empty packets in the working area; the second chaining of the list makes it possible to scan the elements according to increasing sizes of the empty packets in the working area, for the first computer system, a so-called "available packet management" area 503 containing data making it possible to find the positions of blocks of information in the working area to which information intended for the first system has been written by means of the second PCI bus. Among these data are notably the position of the first element in a chained list, the elements of this list being chained according to the order of writing into the dual port memory by the second system, and for the second computer system, a so-called "available packet management" area 504 containing data making it possible to find the positions of blocks of information in the working area to which information intended for the second system has been written by means of the first PCI bus. Among these data are notably the position of the first element in a chained list, the elements of this list being chained according to the order of writing into the dual port memory by the first system.

The different chained lists used to describe either the memory blocks in the working area free for the writing of data, or the memory blocks in the working area containing information intended for the first computer system, or the memory blocks in the working area containing information intended for the second computer system, are also described in the working area.

The writing of a packet, or block, of information into the dual port intermediate memories is preceded by a step of acquiring an empty memory packet, commonly called "memory allocation". Memory allocation consists of extracting an empty memory packet from the list of empty packets. Likewise, the reading of a packet of information from the working area of the dual port intermediate memories is followed by a step of deallocating this memory packet, commonly called memory deallocation. Memory deallocation consists of adding an empty memory packet to the list of empty packets and of checking that there are no contiguous empty memory packets. If there are contiguous empty memory packets, these packets are concatenated to form no more than a single packet.

The list of empty packets is chained twice (and each chaining is double: pointers designating the preceding packets and the following packets):

according to increasing sizes of the empty packets. This chaining makes it possible, by scanning the list, to find the smallest packet with a size greater than that of the packet of information to be stored in the working area of the dual port intermediate memory. Once the empty memory packet has been found, only the size necessary is allocated, and the part of this packet which is not occupied by information, if there is any, constitutes a new empty memory packet corresponding to the size of the remaining memory. This new packet is inserted into the list of empty packets. Updating of the list of packets follows, both on the chaining concerning the sizes and on that concerning the addresses.

according to increasing addresses of the empty packets, this chaining makes it possible, by scanning the list, to know quickly whether the packets situated before and after in the list of addresses are also empty memory packets. If yes, the empty memory packets contiguous at the address level are concatenated in order to form no more than a single (and larger) empty memory packet. Updating of the list of empty packets follows, both on the chaining concerning the sizes and on that concerning the addresses.

The chaining on the sizes is preferably used at the memory allocation step, while the chaining on the addresses is instead used at the memory deallocation step.

The management areas 502, 503 and 504 each occupy a fixed memory space, of fixed size and particularly small in the dual port memories, a space defined at initialisation by one of the first or second systems. The chained lists are each reached by a pointer to the first element in the list. The positions of the management areas 502, 503 and 504 being fixed once and for all at initialisation and stored at a predetermined address of the dual port intermediate memory by any one of the computer systems, according to the initialisation rules defined between the computer systems, the other computer systems obtain knowledge of the positions of these areas 502, 503 and 504 by coming to read the above predetermined address.

It may be noted that, according to a simplified variant, each management area may be limited to a single pointer which corresponds to the address of the first element in each above-mentioned list.

Outside the memory space of each dual port intermediate memory are eight semaphores jointly referenced 505, the use of which is described with reference to FIG. 4.

By virtue of the use of these semaphores, each management area 502, 503 or 504 of the dual port intermediate memory is accessible exclusively to one computer system.

As explained below with reference to FIG. 7A, each computer system constitutes an organisation means adapted so that, each time information has to be written into a dual port intermediate memory, destined for the other computer system, an item of position data is extracted from the empty packet management area 502. Then the said information is written into a part of the working area which corresponds to the said position data, by means of the chained address lists. Finally, the said position data is placed in the available packet management area for the said other system.

In an identical manner, and as illustrated with reference to FIG. 7B, each computer system constitutes an organisation means adapted so that, each time information has to be read from a dual port intermediate memory, coming from the other computer system, an item of position data is extracted from the available packet management area for the first of these systems. Then the said information is read from a part of the working area which corresponds to the said position data, by means of the chained address lists. Finally, the said position data is placed in the empty packet management area 502.

FIG. 6 depicts a first computer system. This computer system has a first processor to PCI bridge 603 connected to:
a first central unit 606, by means of a local bus 608,
a ROM read-only memory 605, by means of a local bus 607,
a RAM random access memory 604, by means of a local bus 601,
interface components 613, managing for example a keyboard, by means of a local bus 612, and
a first bus 602.

The first central unit 606 is, for example, composed of an INTEL PENTIUM processor. The read-only memory 605 contains, on the one hand, the BIOS ("Basic Input Output System") which, in particular, recognises the components connected to the processor to PCI bridge 603 or to the first PCI bus 602 and initialises them, that is to say configures them, possibly assigning memory and interrupts to them and, on the other hand, the program governing the operation of the computer system. To this end, the first processor to PCI bridge 603 carries the data corresponding to the components to which it is connected, such as, for example, the PCI controllers 610 and 611.

The random access memory 604 stores values of variables and intermediate data and data received or intended to be transmitted.

The structure of this computer system is well known to persons skilled in the art of INTEL PENTIUM-based computers with a PCI bus.

FIG. 7A depicts a flow diagram of operation in write mode of the system illustrated in FIGS. 4 and 6.

After the start 700, the test 701 determines whether the first computer system has data to be transmitted to the second system. When the result of the test 701 is negative, the first system continues its operation and the test 701 is reiterated.

When the result of the test 701 is positive, the operation 702 determines the performances necessary for transmission of the data to be transmitted. In the embodiment described and depicted, the performance criterion used is linked solely to the quantity of data to be transmitted and the operation 702 determines that quantity.

However, according to a first variant, the performance criterion used consists of the data transmission speed necessary and, according to a second variant, the performance criterion used consists of a level of priority of the transmission under consideration.

In fact, the data may be transmitted by means of two types of intermediate memory, FIFO type memories which are fast but which contain a small quantity of data and dual port type memories which are slower than FIFO type memories but which if necessary contain more data.

FIFO type memories are therefore preferentially used in DMA mode, which does not necessitate a large memory capacity but, on the other hand, requires a high transfer speed while dual port memories may be used with a delayed read and write, for quantities of information smaller than their capacities.

The test 703 next determines, according to the performance criterion, the intermediate memory used for transmission of the data:
when the quantity of data to be transmitted is less than a threshold value which may, for example, be linked to the quantity of data which can be contained by the working area of the dual port intermediate memories 408 and 412, it is these intermediate memories which are used, during the operations 704 to 706, the interface adapters then operating in "pass-through" mode, and, in the contrary case, it is the FIFO type intermediate memory 409 which is used, the interface adapters and the computer systems operating simultaneously in direct memory access mode, commonly called DMA by persons skilled in the art, during the operations 707 to 710, according to the first variant, when the speed necessary for transmission of the information to be transmitted is less than a threshold value which may, for example, be linked to the speed of reading and writing data in the dual port intermediate memories 408 and 412, it is these intermediate memories which are used, during the operations 704 to 706, the interface adapters then operating in "pass-through" mode, and, in the contrary case, it is the FIFO type intermediate memory 409 which is used, the interface adapters and the computer systems operating simultaneously in direct memory access mode, commonly called DMA by persons skilled in the art, during the operations 707 to 710, and according to the second variant, when the level of priority of the transmission is greater than a threshold value, it is the dual port intermediate memories which are used, during the operations 704 to 706, the interface adapters then operating in "pass-through" mode and, in the contrary case, it is the FIFO type intermediate memory 409 which is used, the interface adapters and the computer systems operating simultaneously in direct memory access mode, commonly called DMA by persons skilled in the art, during the operations 707 to 710.

During the operation 704, the first processor performs, by means of the PCI adapter 405, the reading of an item of empty packet position data by means of the empty packet management area 502 and the updating of the corresponding chained lists, this operation commonly being called an "extraction".

During the write operation 705, the data to be transmitted are stored, by the first processor 403, in the working area 501, at the position corresponding to the position data read during the operation 704.

During the operation 706, the item of position data read during the operation 704 is inserted, by the first processor, into the list of available packets for the second computer system, by means of the available packet management area for the second system 504. This operation 706 is, in the remainder of the description, called an "addition" operation, it being understood that the addition under consideration concerns the addition of an address into the list of available packets for the second computer system.

The characteristics of the dual port intermediate memories 408 and 412 used are such that the writing to a predetermined particular address in this memory causes the sending of an interrupt to the PCI adapter 414 and, consequently, to the second processor 419. The second processor 419 then performs the reading, from the available packet management area for the second system 504, of the data of the position in the working area 501 where the information to be read is located. Next, the second processor 419 performs the reading of the information from the position in the working area 501 which corresponds to the position data read from the available packet management area for the second computer system 504.

When it is the FIFO type intermediate memory 409 which is used for transfer of the data, the operation 707 consists of:

extracting an address from the empty packet management area 502, storing this address in the available packet management area for the second system 504, storing, at that address in the working area 501, the parameters of the future data transfer and the number of data items to be transmitted, and generating an interrupt intended for the second computer system by accessing in write mode a predetermined address of the dual port intermediate memories.

During the operation 708, the first processor 403 waits for an acknowledgement signal from the second processor 419, which signifies that the second computer system has initialised itself in direct memory access mode.

During the operation 709, the processor of the first computer system, in its turn, puts itself into direct memory access mode.

Finally, during the operation 710, the data to be transmitted are successively written by the first processor into the FIFO intermediate memory 409, by means of the PCI adapter 405 and read from this memory, by the second processor, by means of the PCI adapter 414.

It may be noted that, in order to avoid problems of difference between the frequencies of writing and reading the FIFO type intermediate memories, the signals output by these memories, "FIFO empty", "FIFO full" and possibly "FIFO half full", are used by the control component 411 to stop the writing into memory when the memory is full and to stop the reading from this memory when it is empty.

At the end of one of the operations 706 or 710, the first processor returns to the test 701.

FIG. 7B depicts a flow diagram of operation in read mode of the system illustrated in FIG. 4.

When the second computer system has received an interrupt signal, during the operation 721, the second processor 419 performs, by means of the PCI adapter 414, the reading of an item of available packet position data for the second computer system by means of the available packet management area 504 and the updating of the corresponding chained list, this operation, numbered 722, commonly being called an "extraction".

During the read operation 723, the data to be read are read, by the second processor 419, from the working area 501, at the position corresponding to the position data read during the operation 722.

During the addition operation 724, the position data read during the operation 722 is inserted, by the second processor 419, into the list of empty packets, by means of the empty packet management area 501. This operation 724 is, in the remainder of the description, called an "addition" operation, it being understood that the addition under consideration concerns the addition of an address into the list of empty packets.

The test 725 next determines, according to the data read from the working area during the operation 723, whether it is a message requesting that the FIFO type intermediate memory 409 is used for transmission of the data.

When the result of the test 725 is positive, the operation 727 consists of initialising the second computer system 430 in direct memory access, DMA, mode.

During the operation 728, the second processor 419 sends an acknowledgement signal which signifies that it has initialised itself in direct memory access mode.

During the operation 729, the data to be transmitted are successively written by the first processor into the FIFO intermediate memory 409, by means of the PCI adapter 405, and read from this memory by the second processor 419, by means of the PCI adapter 414.

The operation 729 is performed in coordination with the operation 710 (FIG. 7A).

At the end of the operation 729 or when the result of the test 725 is negative, the second processor 419 performs the test 726 which consists of determining whether or not there remains at least one address in the list of addresses of available packets for the second system.

It should be noted that, between the phases of occupation of the computer bus for implementation of the operation 729, other tasks or processings which use the computer bus may be inserted, for example when the FIFO intermediate memory is empty.

When there remains at least one available packet address for the second system, the operation 722 is reiterated.

FIG. 8 depicts a timing diagram of operation of the two computer systems connected by the communication device, according to any one of its embodiments, the downward vertical axis representing the passing of time, the scale not however being linear, the sequence of operations implemented by the two processors concerned thus corresponding to their sequence from top to bottom in FIG. 8.

At the instant of start-up of the computer systems, that is to say when the processors begin to be supplied electrically, the first processor starts up its operation using its start-up program, during the operation 801, and the second processor starts up its operation on its own start-up program, during the operation 802.

Assuming that this start-up is performed more quickly by the second processor than by the first processor, the operation 806 for initialising the PCI controllers present on the second bus is initiated before the operation 803 for initialising the PCI controllers present on the first bus is initiated.

Likewise, the operating program 807 of the second computer system is started sooner than the operating program 804 of the first computer system.

The starting up of the program 807 has a first phase 807A, during which a sub-program, known by the name "driver", is started, that is to say that, in particular, according to the initialisation protocol used by the different computer systems, the dual port intermediate memories are initialised: the positions of the management areas 502, 503 and 504 are determined, the first elements of each chained list are updated, the working area 501 then being considered as a single and first empty packet.

According to a first example, the taking of a semaphore by one of the computer systems implies that the latter is performing the dual port intermediate memory initialisation phase, the other computer systems coming to read the configuration of this dual port intermediate memory at a predetermined address.

According to a second example, it is always the first computer system which performs the initialisation of the dual port intermediate memories.

The same applies to the first computer system, during the phase 804A, apart from the fact that, according to the information present at the above-mentioned predetermined address and the initialisation rules, either it initialises the dual port intermediate memories, or it reads the dual port intermediate memory initialisation data, the latter case corresponding to the example described and depicted in FIG. 8.

Assuming that it is the first computer system which has the first data to be transmitted to the other computer system, the operation 805 consists of starting a data transfer and of triggering, in consequence, an interrupt for the second computer system.

During the operation 808, this interrupt is taken into account and the second computer system performs the reception of the data from the communication device.

Assuming that the second computer system has next to transmit data to the first computer system, the operations 809 and 810 are respectively identical to the operations 805 and 808, the operation 809 consisting, for the second computer system, of starting a data transfer and triggering, in consequence, an interrupt for the first computer system and the operation 810 consisting of this interrupt being taken into account and the reception of the data, by the first computer system.

It may easily be understood that the reading and writing of data can thus be carried out using different addresses, without an initialisation of the two computer systems having to be performed by one of the two processors and without the clocks of the two computer systems being common.

The scope of the invention is not limited to the embodiments described and depicted but on the contrary extends to the improvements and modifications within the capability of persons skilled in the art and, in particular, to the combinations of the different variants explained above.

What is claimed is:

1. A device for communicating between at least two asynchronous computer buses, comprising:
    at least one intermediate storage unit adapted to be accessed in read and/or write mode using at least two different frequencies; and
    an interface adapter, associated with each computer bus, adapted to interface between the associated computer bus and a memory, each interface adapter having an adapter memory and two bidirectional ports, one of said bidirectional ports being connected to the computer bus and the other said bidirectional port being connected to said storage unit, the interface adapters being adapted to utilize the same communication protocol on each of the computer buses,
    wherein each intermediate storage unit is capable of being accessed in write and/or read mode by each of the computer buses and the interface adapter that is associated with that computer bus.

2. A device according to claim 1, wherein one of the storage units comprises a dual port random access memory, each port of said random access memory being connected to one of the interface adapters.

3. A device according to claim 1, wherein at least one of the storage units comprises a random access memory that accesses the data in the same order in read mode as in write mode, the input of said random access memory being connected to one of the interface adapters and the output of said memory being connected to another interface adapter.

4. A device according to claim 3, wherein at least one of the storage units comprises two random access memories that access the data in the same order in read mode as in write mode, the input of a first of said random access memories and the output of a second of said random access memories being connected to one of the interface adapters, and the output of the first of said random access memories and the input of the second of said random access memories being connected to another interface adapter.

5. A device according to claim 1, wherein at least one of the adapter memories has an interrupt and/or address register assigned to it for operation of the interface adapter having that memory, in relation with the computer bus to which it is connected.

6. A device according to claim 1, wherein at least two of the interface adapters are adapted to operate in direct memory access mode.

7. A device according to claim 1, wherein each computer bus includes a clock, and at least two of the clocks are asynchronous.

8. A device according to claim 1, wherein at least two computer buses are connected to a processor.

9. A device according to claim 1, wherein the device has at least two intermediate storage units, one of the intermediate storage units adapted to the transmission of parameters concerning a future transmission using another intermediate storage unit.

10. An information communication device comprising:

at least two storage units;

a first intermediate storage unit;

a second intermediate storage unit, at least one of whose operating characteristics is different from that of the first intermediate storage unit in at least one of the write or read modes;

a switching unit adapted to allow writing and/or reading in one of the first or second intermediate storage units;

a selection unit adapted to select a storage unit adapted to take into account a criterion related to a set of information in order to control the operation of the switching unit and the transmission of the set of information; and a determining unit adapted to determine the value of a performance criterion necessary for the transmission of a set of information by one of the first or second storage units, said performance criterion being the criterion taken into account by the selection unit.

11. A communication device according to claim 10, wherein a different operating characteristic for the two storage units being an access speed, the determining unit determines the value of a performance criterion and the transfer speed.

12. A communication device according to claim 10, wherein the determining unit determines the value of a performance criterion and the dimension of the blocks of information to be transmitted.

13. A communication device according to claim 10; wherein the determining unit determines the value of a performance criterion and the urgency in effecting the transfer of information; and the selection unit is adapted to send, when the transfer is urgent, a signal representing the presence of urgent information, intended for a recipient of the urgent information to be transferred.

14. A communication device according to claim 10, wherein one of the storage units has a dual-port memory.

15. A communication device according to claim 10, wherein at least one of the storage units has a memory in which access to the data is gained in the same order in read mode as in write mode.

16. A communication device according to claim 10, further comprising at least two intermediate storage units, one of the intermediate storage units being adapted to the transmission of parameters relating to a future transmission using another intermediate storage unit.

17. A communication device according to claim 10, wherein the switching unit is adapted to keep the storage unit in a particular state until the selection unit has made a new selection.

18. A device for communicating between at least two memory read/write units, said device having a storage unit, wherein said storage unit comprises:

a working area adapted to receive, in write mode, blocks of information intended to be read;

an empty packet management area including at least one position data item for obtaining at least one address of part of the working area with which no information to be read is associated;

an available packet management area for each read/write unit, each available packet management area including, when at least one information packet is intended for said read/write unit, at least one position data item for obtaining at least one address of part of the working area at which information intended for the said read/write unit has been written; and for each read/write unit, an organization unit adapted so that:

each time information must be written in the said storage unit, intended for a read/write unit, an address is extracted from the addresses which makes it possible to obtain the position data item of the empty packet management area, the information is written in part of the working area which corresponds to said address, and said address is added to the addresses which the position data item of the available packet management area associated with said read/write unit makes it possible to obtain; and each time information has to be read in said storage unit, by a read/write unit, an address is extracted from the addresses which the position data item of the available packet management area associated with said read/write unit makes it possible to obtain, the information is read in the part of the working area which corresponds to said address, and said address is added to the addresses which the position data item of the empty packet management area makes it possible to obtain.

19. A device according to claim 18, wherein each position data item consists of a pointer in a list of addresses of the working area.

20. A device according to claim 18, further comprising an interrupt unit adapted to transmit to the read/write unit for which information is intended a signal representing the presence of information in the packet management area available for said read/write unit.

21. A device according to claim 18, wherein the storage unit has a dual-port random access memory, each of the ports of said random access memory being connected to one of the read/write units.

22. A device according to claim 18, wherein at least one of the read/write units comprises an interface adapter having two bidirectional ports and an adapter memory which has an interrupt and/or address register which are allocated to it for the operation of the adapter.

23. A device according to claim 18, wherein each of the read/write units includes a clock, at least two of the clocks being asynchronous.

24. A device according to claim 18, wherein the positions of the management areas are fixed in the storage units and their dimensions are fixed, each use of the management areas being effected using the same addresses.

25. A device according to claim 18, further comprising a protecting unit that restricts accesses to said management areas of the storage units, adapted to inhibit, and access in read or write mode to the same part of the working area by two read/write units.

26. A computer system including a processor, comprising a communication device according to any one of claims 1 to 25.

27. A computer system having a processor, a display scheme and a keyboard, comprising a communication device according to any one of claims 1 to 25.

28. A method of communication between at least two asynchronous computer buses, comprising the steps of:

storing in an intermediate storage unit, that is adapted to be accessed in write mode, by a first computer bus associated with a first interface adapter having an adapter memory and two bidirectional ports, one of the bidirectional ports being connected to the first computer bus and the other bidirectional port being connected to the storage unit; and reading from the intermediate storage unit adapted to be accessed in read mode, by a second computer bus associated with a second interface adapter having an adapter memory and two bidirectional ports, one of the bidirectional ports being connected to the second computer bus and the other bidirectional port being connected to the storage unit, wherein said storing step and said reading step utilize the same data communication protocol on the computer buses concerned.

29. A method according to claim 28, wherein said storing step is performed using a dual port random access memory, each port of the random access memory being connected to one of the interface adapters, and said storing and reading steps can be performed simultaneously.

30. A method according to claim 28, wherein said reading step includes successively reading the data stored during said storing step in the order in which they were stored during said storing step.

31. A method according to claim 28, wherein said storing and reading steps are performed simultaneously using a direct memory access mode.

32. An information communication method comprising:
a storage unit selection step, that uses information in order to choose between a first intermediate storage unit, and a second intermediate storage unit at least one of whose operating characteristics is different from that of the first intermediate storage unit in at least one of the write or read modes;

a switching step during which access is gained, in write and/or read mode, to the intermediate storage unit chosen;

an information transmission step, during which the said information is transmitted using the storage unit chosen; and a step of determining the value of a performance criterion necessary for the transmission of a set of information by one of the first or second storage, the performance criterion being the criterion taken into account during the storage unit selection step.

33. A communication method according to claim 32, wherein a different operating characteristic for the two storage units being an access speed, during said step of determining the value of a performance criterion, the transfer speed is determined as a performance criterion.

34. A communication method according to claim 32, wherein the information is to be transmitted in blocks, and wherein during said step of determining the value of a performance criterion, the dimension of the blocks of information to be transmitted is determined as a performance criterion.

35. A method according to claim 32, wherein the information is to be transmitted in blocks, and wherein during said step of determining the value of a performance criterion, the urgency of the transmission of the blocks of information to be transmitted is determined as a performance criterion.

36. A method according to claim 32, wherein said transmission step includes an operation of transmitting in direct access mode to the memory.

37. A method according to claim 32, further comprising, prior to said switching step, a parameterising step during which parameters relating to said transmission step are transmitted using a storage unit different from the storage unit used during said transmission step.

38. A method of communication between at least two memory read/write units, utilizing a storage unit having:
a working area adapted to receive, in write mode, blocks of information intended to be read, an empty packet management area including at least one position data item for obtaining at least one address of part of the working area with which no information to be read is associated, and for each read/write unit, an available packet management area including, when at least one information packet is intended for the said read/write unit, at least one position data item for obtaining at least one address of part of the working area at which information intended for the said read/write unit has been written, and including, each time information must be written in the said storage unit, intended for a read/write unit an extraction operation during which an address is extracted from the addresses which the position data item of the empty packet management area makes it possible to obtain, a writing operation, during which the information is written in part of the working area which corresponds to the address, and an adding operation during which the address is added to the addresses which the position data item of the available packet management area associated with the read/write unit makes it possible to obtain; and each time information must be read in the storage unit, intended for a read/write unit:
an extraction operation during which an address is extracted from the addresses which the position data item of the available packet management area associated with the read/write unit makes it possible to obtain, a reading operation, during which the information is read in the part of the working area which corresponds to the address, and a release operation, during which the address is added to the addresses which the position data item of the empty packet management area makes it possible to obtain.

39. A method of communication according to claim 38, wherein, when information must be written in the storage unit, intended for a read/write unit, an interrupt operation is performed, during which there is transmitted, to the read/write unit for which information is intended, a signal representing the presence of information in the packet management area available for the read/write unit.

40. A storage medium for storing thereon instructions which, when executed by a processor, cause the processor to implement the method according to any one of claims 28 to 39.

* * * * *